(12) United States Patent
Zerillo

(10) Patent No.: US 8,428,233 B2
(45) Date of Patent: Apr. 23, 2013

(54) INTERNET PROTOCOL FOR IP PRIVATE BRANCH EXCHANGES

(75) Inventor: Anthony J. Zerillo, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1175 days.

(21) Appl. No.: 12/042,890

(22) Filed: Mar. 5, 2008

(65) Prior Publication Data

US 2009/0225744 A1     Sep. 10, 2009

(51) Int. Cl.
*H04M 3/42* (2006.01)

(52) U.S. Cl.
USPC .................. 379/201.01; 379/219; 379/220.01

(58) Field of Classification Search .................. 379/198, 379/201.01, 219–232; 370/352, 353, 354
See application file for complete search history.

(56) References Cited

U.S. PATENT DOCUMENTS

| | | | |
|---|---|---|---|
| 7,609,830 B1 * | 10/2009 | Croak et al. | 379/201.01 |
| 2005/0025128 A1 * | 2/2005 | Chiu | 370/352 |
| 2007/0043829 A1 * | 2/2007 | Dua | 709/219 |
| 2007/0047717 A1 * | 3/2007 | Ho et al. | 379/218.01 |
| 2009/0074165 A1 * | 3/2009 | Schaade | 379/142.06 |

* cited by examiner

*Primary Examiner* — Ahmad Matar
*Assistant Examiner* — Khai N Nguyen
(74) *Attorney, Agent, or Firm* — Swanson & Bratschun, L.L.C.

(57) ABSTRACT

An Internet protocol query for Internet protocol private branch exchanges including a private branch exchange that is connected to the public switched telephone network for receiving a call setup request, the private branch exchange not being enabled for receiving calling name delivery information from a telecommunications circuit; at least one of an incumbent local exchange carrier switch and a competitive local exchange carrier switch in communication with the private branch exchange, the at least one of the incumbent local exchange carrier switch and the competitive local exchange carrier switch having the telecommunications circuit not enabled for calling name delivery information retrieval; a network in communication with the private branch exchange; and a calling name delivery database in communication with the network for receiving calling name delivery queries from the private branch exchange based on the call setup request. Methods for routing calls based on ENUM information is also included.

16 Claims, 3 Drawing Sheets

INTERNET PROTOCOL FOR IP PRIVATE BRANCH EXCHANGES

FIELD OF THE INVENTION

The field of the invention relates in general to the field of Internet protocol exchanges, in particular, to an Internet protocol query for internet private branch exchanges.

BACKGROUND OF THE INVENTION

Conventional and Internet protocol ("IP") private branch exchanges ("PBXs") are typically connected to the public switched telephone network ("PSTN") through time-division multiplexing ("TDM") integrated services digital network ("ISDN") primary rate interface ("PRI") circuits. Customers typically purchase IP PBXs that have Calling Name Delivery ("CNAM") as a feature. CNAM is a service that displays a caller's name on the calling party's digital readout on their telecommunications device. This is similar to the Caller ID service, but that the calling party's name is displayed along with their calling number or instead of the calling number. The customer pays a fee for the service, which can be anywhere from $50-$90 per PRI per month for the CNAM To deliver the CNAM to the IP PBX, the customer's telecommunications provider, such as an incumbent local exchange carrier ("ILEC") or competitive local exchange carrier ("CLEC"), may launch a CNAM query when a call is destined for the PRI trunk group. The ILEC/CLEC may then deliver the CNAM information via the signaling "D" channel on the PRI. Currently, the IP PBXs connected to the PSTN via PRIs do not have the functionality of launching a query for CNAM information via IP. Typically, the ISDN PRI circuits are purchased from the ILEC/CLEC in an operating region and they generally provide connectivity to the PSTN for both media and signaling traffic.

Current IP PBXs rely on the network of the ILEC/CLEC to query hosted databases for CNAM and other information. In a typical operation, a call setup is attempted for an inbound call and the PRI is equipped with CNAM Delivery, so the ILEC/CLEC Class 5 switch launches a CNAM query to either its database, or to a database provider with whom it has a contract. The database or database provider may be part of or accessed through a signaling transfer point ("STP") or switching control point ("SCP"); this query may either be in IP or TDM format. Generally, the database is queried based on an incoming telephone number and an associated name is delivered to the ILEC/CLEC Class 5 switch. The Class 5 switch passes the CNAM information to a PBX via the SS7 packet, for example. At the PBX, the CNAM data is eventually delivered to the appropriate station on the customer's premise, after which the call takes place.

Typically, the CNAM information is delivered in the SS7 transaction capabilities access part ("TCAP") portion of the packet along with other call setup information, such as parameter set identifier, parameter length, generic name, generic name length, presentation, spare, availability, type of name, and name, for example.

Telephone number mapping or electronic number mapping ("ENUM") is a suite of protocols that unify the telephone numbering system E.164 with the Internet addressing system domain name system ("DNS") by using indirect lookup method to obtain naming authority pointer ("NAPTR") methods. ENUM resolves addressing of telephone numbers to a uniform resource locator ("URL"). If an ENUM query is launched based on the outbound telephone number, then the response may include all URL addresses of the devices (e.g., Instant Messaging ("IM"), fax, mobile, etc.) associated with the telephone numbers. Currently, IP PBXs must rely on their servicing ILEC/CLEC to launch ENUM queries, if desired. Generally, ENUM is used today in voice over internet protocol ("VoIP") Peering Exchanges and for inter-carrier multimedia messaging services ("MMS") routing. ENUM queries launched in IP PBXs via IP connections may provide outbound calls to be routed by IP instead of TDM, and can provide information necessary to support inter-carrier enhanced IP services, such as find-me/follow-me service.

SUMMARY

In one embodiment, the present IP query for IP PBXs may be connected to the PSTN using TDM ISDN PRI circuits that do not have the CNAM delivery feature activated by the ILEC/CLEC Instead of the signaling network of the ILEC/CLEC retrieving the CNAM information, the data is retrieved using public or private IP. In one embodiment, a call setup is attempted for an inbound call. The PRI is not equipped with a CNAM delivery, thus no CNAM query is launched via the Class 5 switch; however, the IP query for IP PBXs switch launches a CNAM query via IP to either its CNAM database, an internal CNAM database, or to a CNAM database provider with whom it may have a contract. At this point, the call setup may be suspended via the PBX signaling TDM The query, based on the incoming caller's telephone number, may be launched to an internal database initially, and then directed to the IP address of a contracted hosted database provider if no response is received initially. In one aspect, the IP address may typically be that of the database provider's Session Border Controller ("SBC"). A SIP SS7 protocol converter may be part of the database provider's system. The incoming caller's name or CNAM information associated with queried telephone number may be delivered to the PBX switch and the appropriate station after which the call may take place. In one embodiment, the present Internet protocol query for Internet protocol private branch exchanges ("IP query for IP PBXs") provides for PBX customers an alternative to ILEC/CLEC provided CNAMs at a cost per PRI.

The present IP query for IP PBXs may allow IP PBX customers to receive CNAM information at a lower price than that which is typically offered. With regard to ENUM, the present IP query for IP PBXs provides IP PBX end users the ability to send queries to the network provider of their choice to receive ENUM information. The present IP query for IP PBXs solves the problems of overpriced CNAM delivery to IP PBXs and limited options for delivery of CNAM and/or ENUM information. In one aspect, the present IP query for IP PBXs provides a query flow from an IP PBX switch in order to retrieve hosted database information.

By having direct access or relationships with databases and database providers for CNAM and other information, they have the potential to acquire the CNAM information for a substantially less cost. IP PBXs owners may determine which incoming calls will be queried, thus providing a greater quality of service. Additionally, queries may be initially routed to an internal database, city/state database, or to an external database provider. Further, IP PBXs owners may choose public IP or may opt for a higher level of quality of service via a dedicated IP connection for signaling traffic.

In one embodiment, the present Internet protocol query for Internet protocol private branch exchanges includes a private branch exchange that is connected to the public switched telephone network for receiving a call setup request, the private branch exchange not being enabled for receiving calling name delivery information from a telecommunications circuit; at least one of an incumbent local exchange carrier switch and a competitive local exchange carrier switch in communication with the private branch exchange, the at least one of the incumbent local exchange carrier switch and the competitive local exchange carrier switch having the telecommunications circuit not enabled for calling name delivery information retrieval; a network in communication with the private branch exchange; and a calling name delivery database in communication with the network for receiving calling name delivery queries from the private branch exchange based on the call setup request.

In another embodiment, the present Internet protocol query for Internet protocol private branch exchanges includes a private branch exchange that is connected to at least one of a public switched telephone network and an internet protocol network for connecting an outbound telephone call from at least one communication device, the private branch exchange in communication with the at least one communication device; a network in communication with the private branch exchange; and an electronic numbering mapping database in communication with the network for receiving electronic numbering mapping database queries from the private branch exchange based on a telephone number of the outbound telephone call.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
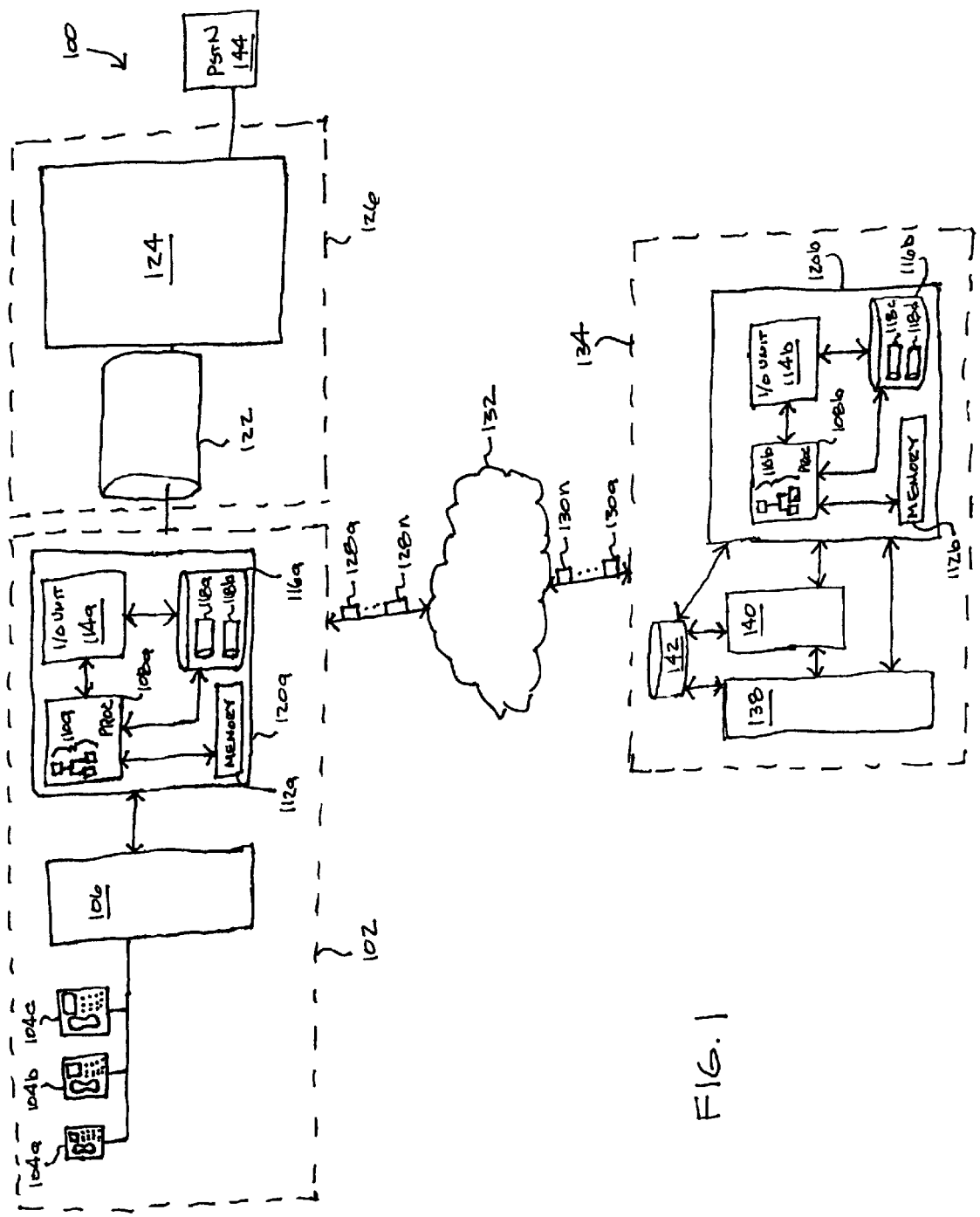
FIG. 1 illustrates a block diagram of an exemplary network for IP query for IP PBXs according to an embodiment of the present invention.

In the drawings, like or similar elements are designated with identical reference numerals throughout the several views and figures thereof, and various depicted elements may not be drawn necessarily to scale.

FIG. 1 illustrates an embodiment of a network 100 for IP query for IP PBXs. In this embodiment, the network 100 may include a customer premise 102 that may include one or more communication devices 104a-104c in communication with a PBX 106. The customer premise 102 may further include server 120a that may be a personal computer for performing and executing programs and instructions and accessing a network 132. The customer premise 102 may be further in communication with an ILEC/CLEC network 126 that may include PRI circuits 122 in communication with the PBX 106 and a telecommunications switch 124, such as a Class 5 switch.

The network 100 may further include a database provider network 134 that is in communication with the network 132. The database provider network 134 may include a session border controller 142 and a gateway 138 in communication with a server 120b; the servers 120a and 120b (collectively 120). The database provider network 134 may further include a signaling transfer point ("STP") 140 that may be in communication with the servers 120 and/or gateway 138. The servers 120 may be any computing devices suitable for communicating with the network 132. The network 132 may be a fiber optic, cable, or telephone network or other wired network or wireless network suitable for communication with the servers 120. In one embodiment, the customer premise 102 may include a wireless router, adapter, switch, hub, or other suitable interface that allows the servers 120 to communicate with the network 132. The ILEC/CLEC network 126 may use a graphical user interface ("GLI"), such as website or program accessible from the servers 120 in order to perform the features and functions herein described. In one embodiment, the ILEC/CLEC network 126 is in communication with the PSTN 144.

Additionally, the servers 120 may include processors 108a and 108b (108a and 108b collectively 108) that execute software 110a and 110b (110a and 110b collectively 110). The processors 108 may be in communication with memories 112a and 112b (112a and 112b collectively 112), an input/output ("I/O") unit 114a and 114b (114a and 114b collectively 114), and storage units 116a and 116b (116a and 116b collectively 116). The storage units 116 may store databases or data repositories 118a-118d thereon. The software 110 may include instructions for execution by the processors 108 for providing ENUM and CNAM information in accordance with the principles of the present IP query for IP PBXs. The servers 120 may be physically located or utilized by the customer premise 102 and database provider network 134, or any other entity in accordance with the with the principles of the present IP query for IP PBXs.

Each of the servers 120 may communicate via the network 132. The network 132 may be the Internet, intranet, wide area networks ("WANs"), local area networks ("LANs"), or other communication systems capable of communicating information between computing devices and/or PBXs. Preferably, the network is at least one of Internet, Intranet, TDMA network CDMA network PCS network GSM network, WMAX network, WLAN, data network packet network, private network, PSTN, and VoIP network. The servers 120 may communicate data packets 128a-128n and 130a-130n containing information related to any of the computer and networks of an entity to another one or more of the servers 120, as understood in the art. Similarly, the servers 120 may communicate information to other servers 120 via data packets 128a-128n and 130a-130n via the network 132. In addition, network 132 may be a communications network a computer network, an Internet network or a combination of them, and the like. In operation, the servers 120 may execute the software 110 to enable the IP query for IP PBXs to acquire CNAM and ENUM information, for example.

In addition, a user may utilize host personal computers (not shown), wired communication devices (not shown), and wireless communications devices (not shown) either directly with the servers 120 or indirectly via the network 132 or other telecommunications networks. The host personal computers and wireless communications devices may enable users of the network 100 to interface with the software 110 to display online menus, catalogs, and the like to a user. Host personal computers, wired communication devices, and wireless communications devices may also include other peripherals, such as keyboards, displays, microphones, and the like. Preferably, the software 110 of the servers 120 is capable of presenting GUIs to their respective displays. Moreover, some or all of the GUIs may display CNAM and ENUM information as described herein.

The telecommunications switch 124 may communicate using a signal control protocol, such as a signaling system number 7 ("SS7") protocol. The SS7 protocol is used in publicly switched networks for establishing connections between switches, performing out-of-band signaling in support of the call-establishment, billing, routing, CNAM and/or ENUM information retrieval, and implementing information-exchange functions of a PSTN. The telecommunications switch 124 may be owned and operated by a local exchange carrier that provides standard telephone service to any number of users. In one embodiment, the telecommunications switch 124 may be a Class 5 switch that is part of the network systems of the local carrier. However, the telecommunications switch 124 may also be a Digital Subscriber Line Access Multiplexer ("DSLAM"), Internet Protocol ("IP") gateway, base station, or any other suitable network access point.

In one embodiment, the telecommunications switch 124 may be a wire-line switch or public exchange using time domain multiplexing to provide telecommunications services to a particular subscriber or groups of subscribers. The telecommunications switch 124 may be located at a local telephone company's central office, or at a business location serving as a PBX. The telecommunications switch 124 may provide dial-tone, calling features, and additional digital and data services to subscribers, such as communication devices 104a-104c. The telecommunications switch 124 may also enable voice over internet protocol ("VoIP") communication of the communication devices 104a-104a through a data network VoIP works by sending voice information in digital form in packets, rather than in the traditional circuit-committed protocols of the publicly switched network.

The network 100 may further include any number of hardware and software elements that may not be shown in the example of FIG. 1. For example, in order to facilitate VoIP communications, the communications system and telecommunications switch 124 in particular may include application servers, media servers, service brokers, call agents, edge routers, gateways (signaling, trunking, access, sub, etc.), IP network service providers, adapters, exchanges, switches, users, bridges, and networks. The telecommunications switch 124 or other components of a wire line network such as a data, PSTN, VoIP, or other wired network may implement the features and perform the methods herein described.

The telecommunications switch 124 may include an authentication space. The authentication space may be a partition of the server or other storage designated by the communications service provider. The authentication space may validate that a user or device, such as a client, is allowed to authorize the telecommunications switch 124 to set preferences, implement changes, review information, or perform other updates. For example, a user may be first required to provide a secure identifier, such as a user name, password, or other authentication code or hardware interface, to verify the user is authorized to make changes within the authentication space.

The authentication information may be used to create a secure connection between the servers 120 and telecommunications switch 124, for example. The secure connection may be a virtual private network tunnel, an encrypted connection, firewall, or other form of secured communications link. The telecommunications switch 124 may use any number of gateways, proxies, applications, or interfaces for allowing the servers 120 to the telecommunications switch 124 through the network 100. Alternatively, the servers 120 may use a wireless network or other network to access the telecommunications switch 124. The telecommunications switch 124 may use a host client application for communicating with numerous clients, for example.

The storage units 116 and/or data repositories 118 may store CNAM and ENUM information as described herein. In one embodiment, the CNAM information may include a directory of telephone or directory numbers and related names for the telephone numbers. The numbers and names may belong to subscribers and non-subscribers of a particular network or telecommunications network. In one aspect, the names are associated with the names of a particular calling party.

Additionally, the storage units 116 and/or data repositories 118 may store ENUM information that unify the telephone numbering system E.164 with the Internet addressing system DNS by using indirect lookup method to obtain NAPTR methods. ENUM is a protocol that resolves addressing of telephone numbers to a URL. If an ENUM query is launched based on the outbound telephone number, then the response may include all URL addresses of the devices, such as IM, fax, mobile, etc., associated with the telephone numbers. ENUM is a routing technology used in VoIP Peering Exchanges and in inter-carrier MMS routing gateways. ENUM queries launched in IP PBXs via IP connections may provide outbound calls to be routed by IP instead of TDM In one embodiment, the ENUM is a suite of protocols developed to unify the telephone system with the Internet by using E.164 addresses with DDDS and DNS. ENUM may also refer to "E164 Number Mapping." VoIP service providers may assign a URI to a customer in order to complete calls over the Internet, but ENUM may not be limited to use for VoIP service. ENUM provides a user with a domain name on an E.164 server in order to associate a common international telephone number with a URI and provide other DNS-related services. The storage units 116 and/or data repositories 118 may store this ENUM information.

In one aspect, an IP address may be associated with each different telephone number. In this example, a telephone number may first be assigned to a user by a carrier for service. The number may then be registered for one or more ENUM services, such as to receive phone calls at a home or office, send emails, or send faxes. These settings that map ENUM registered services to the phone number may be stored in a naming authority pointer ("NAPTR") resource record located in the DNS under E164.arpa domain. A phone number may be translated into an Internet address as follows. Initially, using a telephone number, such as 1-919-460-1234, it is initially stored as +1-919-460-1234, in E.164 format with the "1" as North America's country code. Next, all the characters but the digits are removed, leaving "19194601234." Then, the order of digits is reversed and dots are placed in between each digit, such as "4.3.2.1.0.6.4.9.1.9.1." The domain "E.164" is appended to the end, such as "4.3.2.1.0.6.4.9.1.9.1.e164.arpa." After translating the number into an Internet address, ENUM may issue a DNS query on the domain.

A database provider may determine registration of the E.164 address by associating the address with either a globally unique service provider identifier ("SPID") or a pseudo-service provider identifier ("pseudo-SPID"). The pseudo-SPID may be used to identify the service provider registrant of a telephone number that does not possess a globally unique SPID in the context of industry or regulatory number management systems. A pseudo-SPID may only be applicable within the context of a specific ENUM service.

Further, a database provider may identify the service provider associated with a telephone number for routing calls and messages, and optionally mapping a telephone number to the URI associated with the service provider. Customers may query the ENUM database through DNS queries or through an ENUM application programming interface ("API"), such as Java. In one aspect, IP PBXs may receive software updates for performing the functionality herein described.

In one embodiment, the PRI circuits 122 may include a circuit switch PRI or a TDM PRI circuit that includes 23 bearer channels that are 64 k each, for example. The PRI circuits 122 may further include a signaling channel of 64 k In one aspect, the signaling link within the PRI circuits 122 may include standard call setup information. It also may include past caller ID information and any signaling that needs to take place between the regulars on either side of the PRI circuits 122, such as ILEC/CLEC network 126. The bearer channels may include voice, video, and data traffic, for example.

Figure 2:
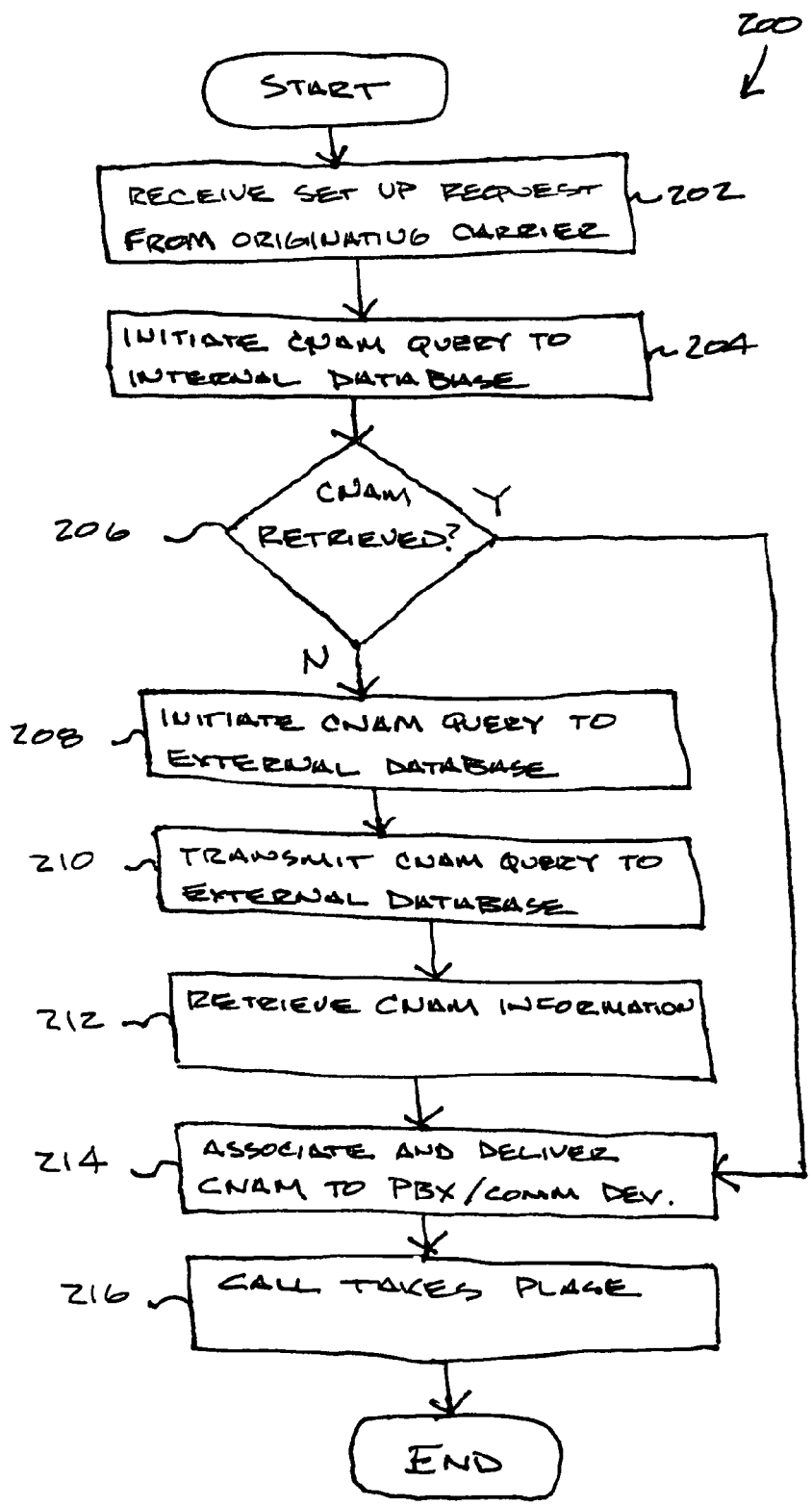
FIG. 2 illustrates a flow chart of an exemplary process for associating CNAM information with an incoming call according to an embodiment of the present invention.

In addition to the aforementioned aspects and embodiments, the IP query for IP PBXs further includes methods for associating CNAM information and routing calls based on ENUM information. FIG. 2 illustrates an embodiment 200 of a method for CNAM inquiries with the present IP query IP PBXs. In step 202, a call setup request may be received containing a telephone or directory number from an originating carrier to the telecommunications switch 124 from the PSTN 144. In step 204, an IP PBX, such as PBX 106, launches an IP query for CNAM information. This step may include initiating a query at an internal database, such as storage unit 116*a* and/or data repository 118*a* or 118*b*. In step 206, an inquiry is made as to whether the internal database was able to provide a name or CNAM information associated with the telephone or directory number. If the answer to the inquiry is "yes," then in step 214 the IP query for IP PBXs associated CNAM is delivered to the PBX 106 and the appropriate communication device 104*a*-104*c* where the call is bound.

If the answer to the inquiry in step 206 is "no," then in step 208 the IP query for IP PBXs initiates a query to an external CNAM database. This step may include suspending the call setup via the PBX 106 signaling TDM. This step may also include that the IP PBX suspends call processing and launches an IP query via its data connection to the Internet or network 132, as described in step 210. The external database may be a database under contract or associated with a particular telecommunications service provider and the like. This step may further include that the placed call that is destined for communication devices 104*a*-104*c* and/or PBX 106 and the call setup messages are exchanged with the serving switch and the PBX 106. As described above, the PBX 106 may be in communication with the PSTN 144 using PRI circuits 122, such as TDM ISDN PRI circuits. In this embodiment, the PRI circuits 122 do not have CNAM delivery feature activated by the telecommunications switch 124. Thus, instead of the ILEC/CLEC network 126 retrieving CNAM information from the telecommunications switch 124, it is retrieved by the PBX 106 and/or customer premise 102 from an external database, such as storage units 116, and data repositories 118, or servers 120.

In step 210, the IP query for IP PBXs may launch an IP query to storage units 116, and data repositories 118, or servers 120 via the network 132 using a pre-populated IP address. This step may include that the IP query is launched to a pre-populated IP address, thus directing the query to the desired database provider, such as storage units 116, and data repositories 118, or servers 120. In one aspect, the IP address may be the IP address of the session border controller 142 of the storage units 116, and data repositories 118, or servers 120. The IP query may be directed over the network 132, such as the Internet via a public or private connection (i.e., VPN). This step may further include that the database provider responds with CNAM information associated with the incoming caller's telephone number in IP format. In one embodiment, a SIP-SS7 protocol converter, such as gateway 138, may be used to convert the telephone or directory number to an IP address as described herein.

In step 212, the system then retrieves the CNAM information from the external database provider. In step, 214, the retrieved CNAM information is transmitted back to the PBX 106 for associating with the telephone or directory number for forwarding to the appropriate communication device 104*a*-104*c* relating to the call setup request. The IP PBX, such as PBX 106, receives the CNAM information and delivers to the appropriate station, such as communication devices 104*a*-104*c*, and the call takes place in step 216.

In one aspect, the customer premise 102 may be selective regarding the CNAM inquiries to make based on the call setup telephone numbers. For example, if the customer premise 102 and/or PBX 106 determine that an incoming telephone or directory number does not need CNAM information, then it may not query its internal CNAM information databases or initiate a query through the network 132 to a database provider's network such as database provider network 134. This may improve the quality of service, by providing efficient queries based on determinations of the customer premise 102.

Figure 3:
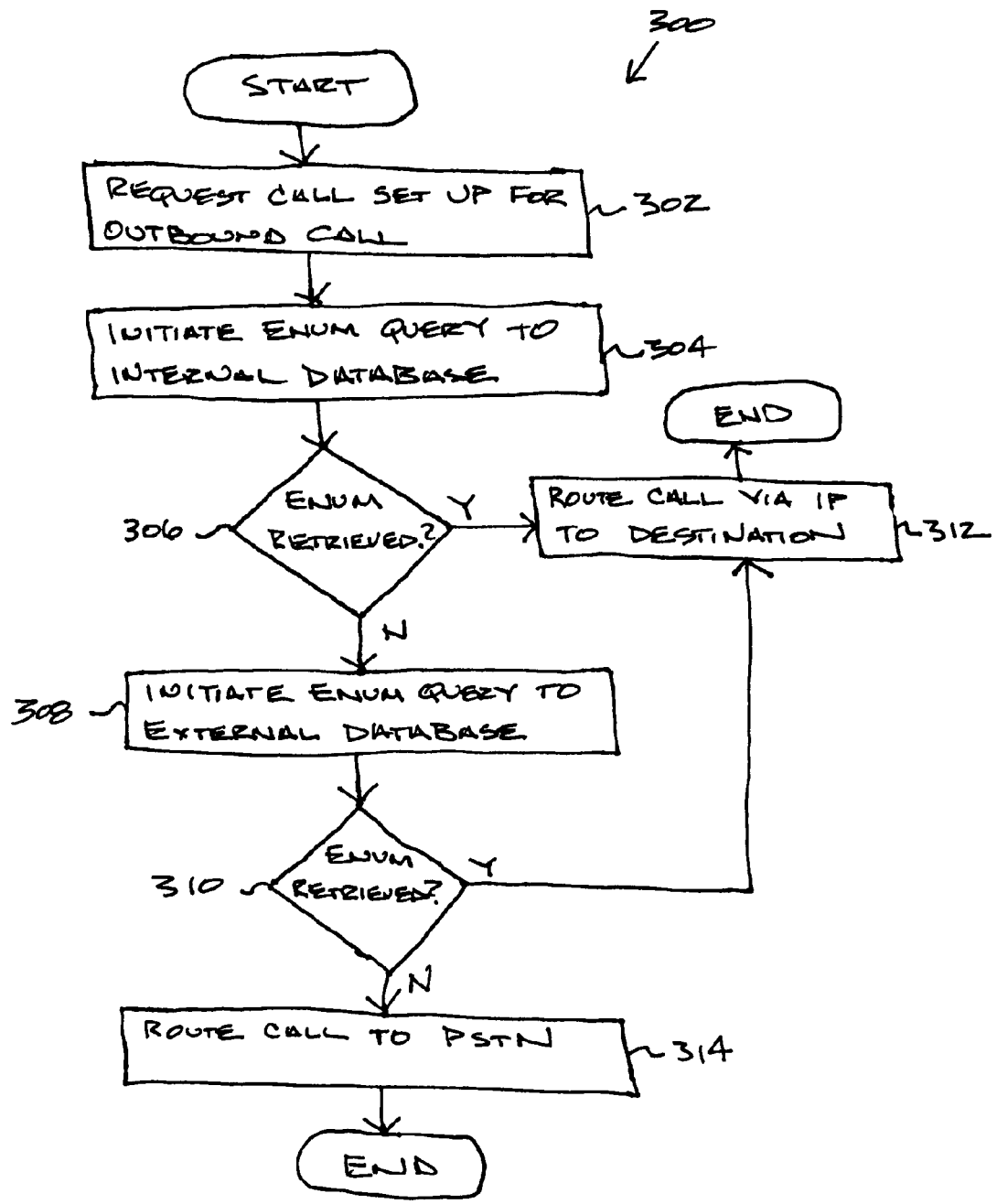
FIG. 3 illustrates a flow chart of an exemplary process for routing a call via IP to a destination according to an embodiment of the present invention.

FIG. 3 illustrates an embodiment 300 of a method for ENUM inquiries with the present IP query IP PBXs. As mentioned above, ENUM information may be used today in VoIP Peering Exchanges and for inter-carrier MMS routing. In one embodiment, ENUM queries launched by IP PBX connections, such as PBX 106, may allow outbound calls to be routed via IP instead of TDM if desired. In step 302, a call setup for an outbound call is requested from the communication devices 104*a*-104*c* and/or PBX 106. This step may include initiating a call from the communication devices 104*a*-104*c* by a user. In step 304, the terminating telephone or directory number may be used to launch an ENUM information query to an internal database, such as storage unit 116*a* and/or data repository 118*a* or 118*b*. In step 306, an inquiry is made as to whether the internal database was able to provide an ENUM information associated with the dialed telephone or directory number. This step may include retrieving an IP address associated with the dialed telephone or directory number from an internal database, such as storage unit 116*a* and/or data repository 118*a* or 118*b*.

If the answer to the inquiry in step 306 is "yes," then in step 312 the IP query for IP PBXs associated ENUM information is delivered to the PBX 106 and the appropriate communication device 104*a*-104*c*. In step 312, an IP address associated with the dialed telephone or directory number is retrieved and the call may be routed through the telecommunications switch 124 via the PBX 106, for example. This step may include routing the call through a public or private IP to the destination either directly to a VoIP provider or a Peering exchange, for example.

If the answer to the inquiry in step 306 is "no," then in step 308 the IP query for IP PBXs initiates a query to an external ENUM database for ENUM information associated with the dialed telephone or directory number. This step may include suspending the call setup via the PBX 106 signaling TDM. This step may also include that the IP PBX suspends call processing and launches an IP query via its data connection to the Internet or network 132. The external database may be an ENUM database under contract or associated with a particular telecommunications service provider and the like.

In step 310, an inquiry is made as to whether the external database, such as database provider network 134, was able to provide an ENUM information associated with the dialed telephone or directory number. This step may include retrieving an IP address associated with the dialed telephone or directory number from an internal database, such as storage unit 116*a* and/or data repository 118*a* or 118*b*. If the answer to the inquiry in step 310 is "yes," then in step 312 the IP query for IP PBXs associated ENUM information is delivered to the PBX 106 and the appropriate communication device 104*a*-104*c*. In step 312, an IP address associated with the dialed telephone or directory number is retrieved and the call may be routed through the network 132 via the PBX 106, for example. This step may include routing the call through a public or private IP to the destination either directly to a VoIP provider or a Peering exchange, for example. In one aspect, routing calls bilaterally to Peering partners or to Peering exchanges may be less expensive than through the PSTN. Additionally, call routed to Peering partners or to Peering exchanges may be maintained in IP format, instead of converted to TDM and back to IP. Such protocol conversions may introduce latency which is detrimental quality of service. In one aspect, users of the IP query for IP PBXs may choose public IP or may opt for a higher level of higher level of quality of service via a dedicated IP connection, for both IP signaling and media traffic.

If the answer to the inquiry in step 310 is "no," then in step 314 the IP query for IP PBXs routes the call to the PSTN. In this step, appropriate signaling to the PSTN may take place as is known in the art.

In one aspect, the customer premise 102 may be selective regarding the ENUM inquiries to make based on the dialed telephone number. For example, if the customer premise 102 and/or PBX 106 determines that the dialed telephone or directory number does not need ENUM information, then it may not query its internal ENUM information databases or initiate a query through the network 132 to a database provider's network, such as database provider network 134. This may improve the quality of service, by providing efficient queries based on determinations of the customer premise 102.

There has been described a system and method for distributing electronic information. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, particular additional servers, computers, networks and the like may be used to convey the information categories and related stored documents without departing from the inventive concepts.

What is claimed:

1. An Internet protocol query system for Internet protocol private branch exchanges, the system comprising:
   a private branch exchange that is connected to the public switched telephone network for receiving a call setup request, the private branch exchange not being enabled for receiving calling name delivery information from a telecommunications; circuit, wherein the private branch exchange includes an internal name delivery database;
   at least one of an incumbent local exchange carrier switch and a competitive local exchange carrier switch in communication with the private branch exchange, the at least one of an incumbent local exchange carrier switch and a competitive local exchange carrier switch having the telecommunications circuit not enabled for calling name delivery information retrieval, wherein the internal name delivery database is independent of the at least one of an incumbent local exchange carrier switch and a competitive local exchange carrier switch;
   a network in communication with the private branch exchange; and
   an external calling name delivery database, which is external to the private branch exchange and which is independent of the at least one of an incumbent local exchange carrier switch and a competitive local exchange carrier switch, in communication with the network for receiving calling name delivery queries from the private branch exchange based on the call setup request,
   wherein, in response to a determination that an incoming telephone number associated with the call setup request does not require calling name delivery information, the private branch exchange is configured to withhold sending calling name delivery queries to both the internal name delivery database and the external calling name delivery database.

2. The Internet protocol query system for Internet protocol private branch exchanges of claim 1 wherein the telecommunications circuit is a primary rate interface circuit.

3. The Internet protocol query system for Internet protocol private branch exchanges of claim 1 wherein the telecommunications circuit is a time-division multiplexing integrated services digital network primary rate interface circuit.

4. The Internet protocol query system for Internet protocol private branch exchanges of claim 1 wherein the at least one of an incumbent local exchange carrier switch and a competitive local exchange carrier switch is a Class 5 telecommunications switch.

5. The Internet protocol query system for Internet protocol private branch exchanges of claim 1 wherein the at least one of an incumbent local exchange carrier switch and a competitive local exchange carrier switch is selected from the group consisting of Digital Subscriber Line Access Multiplexer, Internet Protocol gateway, base station, and a network access point.

6. The Internet protocol query system for Internet protocol private branch exchanges of claim 1 further comprising:
   at least one communications device in communication with the private branch exchange for receiving the call setup information and associated calling name delivery information.

7. An Internet protocol query system for Internet protocol private branch exchanges, the system comprising:
   a private branch exchange that is connected to at least one of a public switched telephone network and an internet protocol network for connecting an outbound telephone call from at least one communication device, the private branch exchange in communication with the at least one communication device, wherein the private branch exchange includes an internal electronic numbering mapping database;
   a network in communication with the private branch exchange; and
   an external electronic numbering mapping database, which is external to the private branch exchange, in communication with the network for receiving electronic numbering mapping database queries from the private branch exchange based on a telephone number of the outbound telephone call, wherein the electronic numbering mapping database queries are based on a suite of protocols that unify the telephone numbering system with the Internet addressing system domain naming system,
   wherein, in response to a determination that the telephone number of the outbound telephone call does not require electronic numbering mapping information, the private branch exchange is configured to withhold sending electronic numbering mapping database queries to both the internal electronic numbering mapping database and the external electronic numbering mapping database.

8. The Internet protocol query system for Internet protocol private branch exchanges of claim 7, wherein the electronic numbering mapping database includes Internet protocol addresses associated with their respective telephone numbers.

9. The Internet protocol query system for Internet protocol private branch exchanges of claim 7, wherein the electronic numbering mapping database stores E.164 addresses relating to the telephone numbers.

10. A method for associating calling name delivery information with an incoming telephone call comprising:
   receiving a call setup request including a telephone number from at least one communications device;
   determining whether the telephone number requires calling name delivery information;
   in response to a determination that the telephone number requires calling name delivery information:
      querying an internal database, which is independent of at least one of an incumbent local exchange carrier switch and a competitive local exchange carrier switch, for calling name delivery information related to the call setup request;
      querying an external database, which is independent of the at least one of an incumbent local exchange carrier switch and a competitive local exchange carrier switch, for calling name delivery information related to the call setup request, in response to a determination that the internal database is unable to provide requested calling name delivery information;
      retrieving the calling name delivery information from one of the internal database or the external database, each of which is independent of the at least one of an incumbent local exchange carrier switch and a competitive local exchange carrier switch; and
      transmitting the calling name delivery information to the at least one communications device; and
   in response to a determination that the telephone number does not require calling name delivery information, withholding sending calling name delivery queries to both the internal name delivery database and the external calling name delivery database.

11. The method for associating calling name delivery information with the incoming telephone call of claim 10 further comprising:
   suspending the call processing through a private branch exchange until the calling name delivery information is retrieved.

12. The method for associating calling name delivery information with an incoming telephone call of claim 10 further comprising:
   selecting those call setup request to query for calling name delivery information.

13. A method for routing a call comprising:
   receiving a call setup request including a telephone number for an outbound call from at least one communications device;
   determining whether the telephone number requires electronic numbering mapping information;
   in response to a determination that the telephone number requires electronic numbering mapping information:
      querying an internal database for electronic numbering mapping information related to the call setup request;
      querying an external database via a network for electronic numbering mapping information related to the call setup request, in response to a determination that the internal database is unable to provide requested electronic numbering mapping information;
      retrieving the electronic numbering mapping information from one of the internal database or the external database, wherein the electronic numbering mapping information is based on a suite of protocols that unify the telephone numbering system with the Internet addressing system domain naming system; and
      responsive to retrieving the electronic numbering mapping information, routing the call setup request to one of a public switched telephone network and an Internet protocol network based on the retrieved electronic numbering mapping information; and
   in response to a determination that the telephone number does not require electronic numbering mapping information, withholding sending electronic numbering mapping database queries to both the internal database and the external database.

14. A private branch exchange for associating calling name delivery information to a call setup request comprising:
   a private branch exchange not in communication with time-division multiplexing integrated services digital network primary rate interface circuits;
   an internal calling name delivery database for associating calling name delivery information with the call setup request, said internal calling name delivery database being communicatively coupled to the private branch exchange, said internal calling name delivery database being independent of at least one of an incumbent local exchange carrier switch and a competitive local exchange carrier switch; and
   a port to a network for accessing an external calling name delivery database for associating calling name delivery information with the call setup request, said port being communicatively coupled to the private branch exchange, wherein said external calling name delivery database is independent of at least one of an incumbent local exchange carrier switch and a competitive local exchange carrier switch,
   wherein, in response to a determination that an incoming telephone number associated with the call setup request does not require calling name delivery information, the private branch exchange is configured to withhold sending calling name delivery queries to both the internal name delivery database and the external calling name delivery database.

15. A private branch exchange for retrieving electronic numbering mapping database information comprising:
   a private branch exchange not in communication with time-division multiplexing integrated services digital network primary rate interface circuits;
   an internal electronic numbering mapping database for receiving electronic numbering mapping queries, said internal electronic numbering mapping database being communicatively coupled to the private branch exchange, wherein the electronic numbering mapping information is based on a suite of protocols that unify the telephone numbering system with the Internet addressing system domain naming system; and
   a port to a network for accessing an external electronic numbering mapping database for receiving electronic numbering mapping queries,
   wherein, in response to a determination that the telephone number of an outbound telephone call does not require electronic numbering mapping information, the private branch exchange is configured to withhold sending electronic numbering mapping database queries to both the internal electronic numbering mapping database and the external electronic numbering mapping database.

16. The private branch exchange of claim 15, wherein the port to the network for accessing the external electronic numbering mapping database is configured to route a call to one of public switched telephone network and an Internet protocol network based on the electronic numbering mapping information.

\* \* \* \* \*